UNITED STATES PATENT OFFICE.

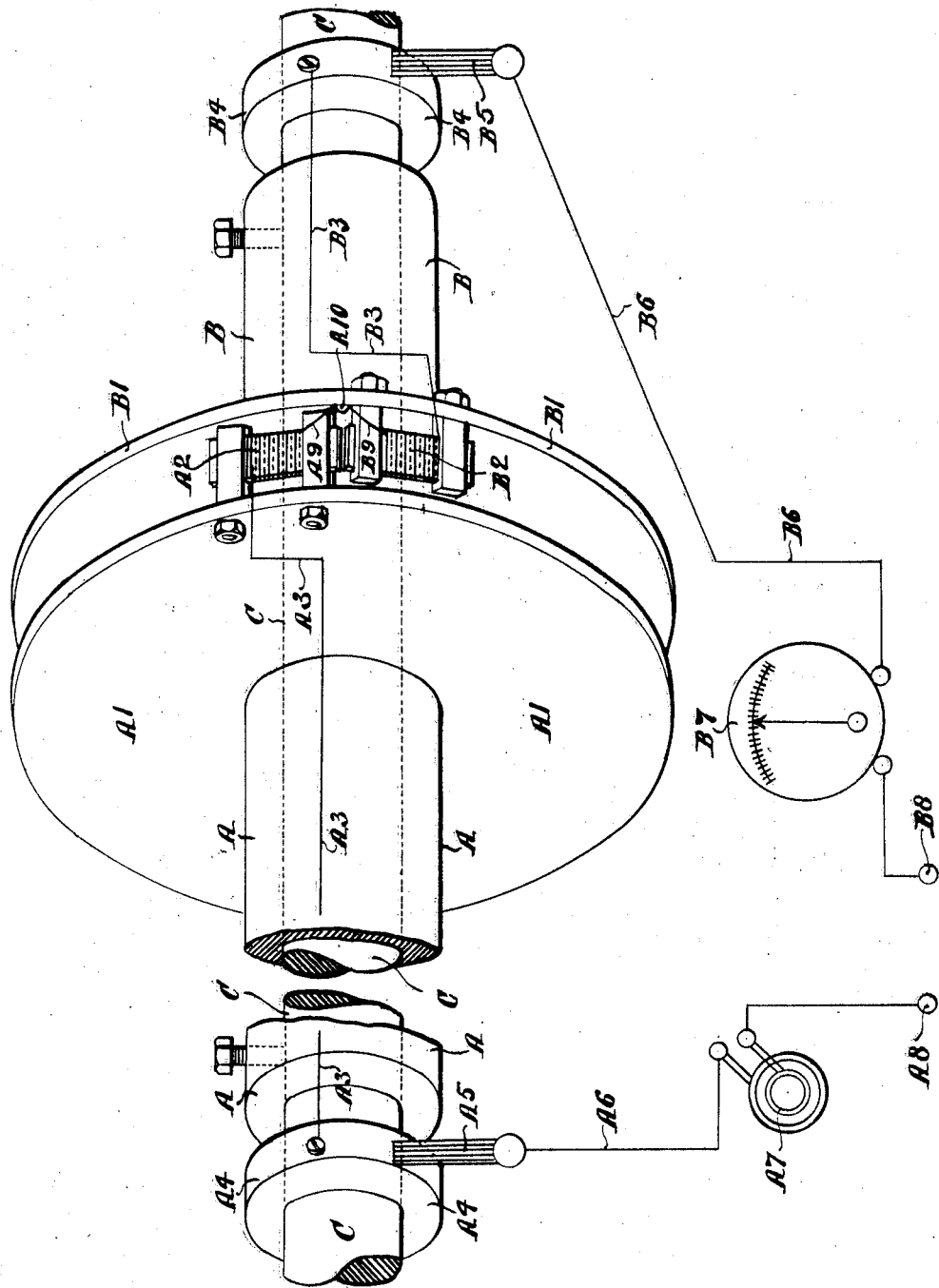

CHARLES HENRY JOHNSON, OF DUMBARTON, SCOTLAND.

ELECTRICAL TORSIOMETER.

979,503.  Specification of Letters Patent.  Patented Dec. 27, 1910.

Application filed December 4, 1909. Serial No. 531,418.

*To all whom it may concern:*

Be it known that I, CHARLES HENRY JOHNSON, a subject of the King of Great Britain and Ireland, and a resident of Dumbarton, in the county of Dumbarton, Scotland, have invented a certain new and useful Electrical Torsiometer, and of which the following is the specification.

Apparatus made according to the invention is of known form in so far as that it consists of a pair of sleeves or equivalents of determinate length arranged upon the shaft, the angle of torsion of which is to be measured; the outer end of the sleeves being rigidly secured to the shaft, while their inner and adjacent ends are free. Alternatively, there may be used a single comparatively longer sleeve attached at one end to the shaft and having adjacent to its free end a device fixed upon the shaft.

The invention relates to the means for measuring the displacement of points upon the adjacent parts of the sleeves or their equivalents.

According to the invention there is provided firstly, a device for creating a magnetic field, secondly, a device in which that magnetic field induces a current, and, thirdly, means for varying the inductive effect of the first device upon the second in accordance with the relative movements of the sleeves or equivalents.

Specifically, the first two elements consist of electro-magnetic coils (cored or without cores), while the third element is the sleeves or equivalents, that is to say, the relative movement of the sleeves controls the effect of the magnetic field of the first device upon the winding of the second device. The most obvious method of carrying out the invention is therefore that in which the first element is fixed to one sleeve and the second to the other, their positions being so adjacent that the relative movements of the sleeves cause an effective variation in the inductive effect of the first device upon the second. It is, however, clear that the third element may alternatively be any means for altering or deflecting the flux developed in the first device in such manner as to vary its effect upon the second device in accordance with the relative movements of the sleeves or equivalents.

There is provided an instrument of voltmeter type for indicating the current induced in the coil of the second device, and it is at once apparent that the indication given by that instrument will vary with variation in the position of points upon the sleeves, and that it may therefore be readily calibrated to directly indicate the amount of torsion applied to the shaft. It is further apparent that if the current traversing the coils of the first device be supplied by a generator (properly wound to that end), driven from the shaft the torsion in which is being measured, the current it supplies and the current the first device induces in the second will vary with the speed of the shaft, and that therefore a reading of torsion plus speed will be given by the voltmeter or like instrument, and that that instrument may therefore be calibrated to indicate horse power directly.

According to a simple example given by way of illustration, there are provided adjacently upon adjacent parts of the sleeves or equivalents, one upon each sleeve, two iron cores carrying windings, the winding upon the one—the first device—being connected through slip rings or brushes with a source of current; the winding upon the other—the second device—being similarly connected with the indicating instrument. The cores are so fixed that but a small space separates their adjacent ends, which space of course varies with the circumferential displacement of the sleeves relatively to each other under torsion of the shaft.

The current employed to energize the first device may be either alternating or continuous, in the latter case it must, of course, be interrupted.

It is found that by maintaining a current of constant strength through the first mentioned windings and altering the length of air gap separating the cores, the induced current in the second winding alters in strength by an amount proportional to the alteration of the length of the air gap, this proportional alteration being shown by the indicating instrument. It only remains therefore, to calibrate the scale of the indicating instrument so that a known alteration in the air gap length will give a corresponding reading on the scale of the instrument which reading may be either a measurement of air gap length or of torsion at the periphery of shaft or of both these.

As illustrative but not in any measure limitative of the carrying out of the invention, there is shown diagrammatically, upon a sheet of explanatory drawings hereunto annexed, a simple example of electric torsiometer made according to the invention. In this example there are two sleeves A B attached at their outer ends to the shaft C the torsion in which is to be measured and carrying at their adjacent ends disks $A^1$, $B^1$. Upon the disks and with their pole faces closely adjacent are electromagnets $A^2$, $B^2$. One end of the winding of the magnet $A^2$ is connected through a wire $A^3$, slip ring $A^4$, collecting brush $A^5$, and wire $A^6$, with an alternating generator $A^7$ the opposite pole of which is earthed at $A^8$. The other end $A^9$ of the winding is earthed to a stud $A^{10}$ on the disk $B^1$. One end of the winding of the magnet $B^2$ is connected through a wire $B^3$, slip ring $B^4$, collecting brush $B^5$, and wire $B^6$, with an indicating instrument $B^7$ of the type hereinbefore set forth and the other terminal of which is earthed at $B^8$. The other end $B^9$ of the winding is earthed to the stud $A^{10}$.

As illustrative of convenient proportions but not as limiting those proportions, the sleeves A B may be of such length and the point of attachment of the magnets $A^2$, $B^2$, be at such radial distance, that between the opposed pole faces of the magnets $A^2$ $B^2$ there takes place a total movement from full torsion on revolution in one direction to full torsion on revolution in the opposite direction of 0.2″ while the pole faces are set at a mean or zero distance apart of 0.15″.

While the invention has been hereinbefore set forth and explained in its application as a torsiometer it is obviously equally applicable in a gage or other device for making minute measurements other than of torsion; for example, measurements of compression or extension or merely of size, the magnets or equivalent devices being so set upon the instrument for the particular purpose that their poles (or equivalent co-acting parts) are moved to and from each other in setting the instrument to measure a greater or less dimension, and it is therefore to be understood that the word torsiometer used in the claims comprises instruments devised for these other purposes, while the word "sleeves" and the word "disks" also comprise their obvious equivalents.

What I claim is:—

1. An electric torsiometer comprising relatively moving measuring parts mounted upon a rotor, electromagnets upon the parts, the pole faces of the said magnets being adjacent, an electric generator in circuit with the winding of one magnet, and an indicator of induced current in circuit with the winding of the other magnet.

2. An electric torsiometer for shafts comprising sleeves and disks upon the shaft, electromagnetic coils carried adjacently upon the opposed disks, means for causing in one coil a flux having an inductive effect on the other coil, and means for measuring that inductive effect.

3. An electric torsiometer for shafts comprising sleeves and disks upon the shaft, electromagnets upon the disks, the pole faces of the said magnets being adjacent, an electric generator in circuit with the winding of one magnet and an indicator of induced current in circuit with the winding of the other magnet.

4. An electric torsiometer for shafts comprising sleeves and disks upon the shaft, electromagnets upon the disks, the pole faces of the said magnets being adjacent, an electric generator in circuit with the winding of one magnet and driven from the shaft, and an indicator of induced current in circuit with the winding of the other magnet.

In testimony whereof I have signed my name to this specification, in the presence of two subscribing witnesses.

CHARLES HENRY JOHNSON.

Witnesses:
DAVID FERGUSON,
ALFRED HUNT.